(12) United States Patent
Goldack

(10) Patent No.: US 6,650,031 B1
(45) Date of Patent: Nov. 18, 2003

(54) PROTECTIVE SYSTEM FOR A SOLAR MODULE

(75) Inventor: Daniel Goldack, Deggendorf (DE)

(73) Assignee: Siemens and Shell Solar GmbH (NL)

(*) Notice: Subject to any disclaimer, the term of this patent is extended or adjusted under 35 U.S.C. 154(b) by 0 days.

(21) Appl. No.: 09/806,109

(22) PCT Filed: Sep. 22, 1999

(86) PCT No.: PCT/EP99/07064

§ 371 (c)(1),
(2), (4) Date: Jul. 5, 2001

(87) PCT Pub. No.: WO00/19580

PCT Pub. Date: Apr. 6, 2000

(30) Foreign Application Priority Data

Sep. 30, 1998 (DE) .......................... 198 44 977

(51) Int. Cl.[7] .................................. H02J 7/00
(52) U.S. Cl. ...................... 307/149; 307/85; 340/825.6; 361/68
(58) Field of Search ................. 307/149, 85; 340/825.6; 361/68

(56) References Cited

U.S. PATENT DOCUMENTS

| | | | | |
|---|---|---|---|---|
| 5,184,119 A | * | 2/1993 | Stanbury et al. | 340/825.6 |
| 5,631,795 A | * | 5/1997 | Koyama | 361/69 |
| 5,815,087 A | * | 9/1998 | Campbell et al. | 340/825.54 |
| 6,072,299 A | * | 6/2000 | Kurle et al. | 320/112 |

FOREIGN PATENT DOCUMENTS

| | | | |
|---|---|---|---|
| DE | 36 41 230 C1 | 4/1988 | |
| DE | 38 15 691 A1 | 11/1989 | |
| DE | 41 23 666 A1 | 7/1992 | |
| EP | 0 718 952 A2 | 6/1996 | |
| FR | WO 97/42664 | * 11/1997 | H02J/7/35 |
| WO | WO 97/42664 A1 | 11/1997 | |
| WO | WO 98/36388 A1 | 8/1998 | |
| ZA | WO 98/36388 | * 2/1998 | H02J/7/35 |

* cited by examiner

Primary Examiner—Brian Sircus
Assistant Examiner—Robert L DeBeradinis
(74) Attorney, Agent, or Firm—Wolf, Greenfield & Sacks, P.C.

(57) ABSTRACT

The invention relates to a system for protecting a solar module against theft or unauthorized use by an authorized consumer. Said system comprises an interruption device on the solar module side and a release device on the consumer side. The interruption device transmits a first signal to the release device via a power line and interrupts the transfer, via a power line, of energy generated by the solar module to the consumer if the interruption device does not receive, via said power line, a second signal from the release device within a specified first period. This permits the secure and economical protection of the solar module, since a solar module protected in the manner described above is of no value without the second signal.

17 Claims, 7 Drawing Sheets

PROTECTIVE SYSTEM FOR A SOLAR MODULE

RELATED APPLICATIONS

This application claims the benefit under 35 U.S.C. §365 (c) of PCT International application PCT/EP99/07064 filed Sep. 22, 1999, designating the United States of America and published under PCT Article 21(2) in German, of which this application is a national stage filing under 35 U.S.C. §371.

Foreign priority benefits are claimed under 35 U.S.C. §119(a)–(d) or 35 U.S.C. §365(b) of German application number 19844977.1, filed Sep. 30, 1998.

FIELD OF THE INVENTION

The invention relates to a security system for a solar module, more particularly for preventing unauthorized use by a consumer, a method for power transfer from a solar module to a consumer, a device for disabling power output of a solar module as well as a device for enabling power transfer from a solar module to a consumer.

BACKGROUND OF THE INVENTION

Increasing environmental pollution is resulting in the use of regenerative energy, such as e.g. solar energy gaining in significance, it being particularly the development of ever more powerful solar modules that is making the use of regenerative solar energy possible in a broad scale of applications. It is especially in the case of small to medium power consumers needing to receive energy independently of a power grid that stand-alone solar modules have become popular due to their high performance, freedom from maintenance and simple application. However, since solar modules are put to use as a rule at locations which are difficult to monitor, such as e.g. the power supply for a traffic sign located remote from a power grid, or e.g. on the roof of a mobile home, it often occurs that the solar modules are stolen or made use of by an unauthorized consumer.

Current means usual for preventing unauthorized use or theft consist, as a rule, of a solid housing in conjunction with a strong lock. These means of security have the disadvantage, however, of being easily broken open by force and, in addition need to be configured heavy and solid for efficient security.

Known from German patent 36 41 230 C1 is an anti-theft system, more particularly for car radios. In this arrangement a first module A is sited in the car radio and a second module B at some other location in the car which is inaccessible. Module A regularly interrogates the security code in module B and compares it to a reference code memorized in module A. As long as both agree the radio remains enabled until the next interrogation. If there is no code agreement the radio is disabled, thus making it useless to steal the radio since it cannot function without the inaccessible module B.

Known from German patent 41 23 666 A1 is a security system for a mobile item of equipment prone to theft, such as a vehicle. In this case a code comparison is made between a code memorized in an ignition key and a code stored in a CPU in deciding whether devices critical to operation of the vehicle can be enabled.

SUMMARY OF THE INVENTION

The present invention is based on the object of providing security against unauthorized use of a solar module which although simple and cost-effective reliably prevents unauthorized use or theft.

This object is achieved in accordance with the present invention by a security system as set forth in claim 1, a method as set forth in claim 5, a disabling device as set forth in claim 8 and an enabling device as set forth in claim 14.

Preferred aspects read from the dependent claims.

The security system in accordance with the invention stops by advantageous ways and means the power output when the solar module-sited disabling device fails to receive a second signal via the power line within a first predefined time after having sent a first signal to the consumer-sited enabling device via the power line. Thus, if an unauthorized user having tapped into or stolen the solar module connects a consumer to the solar module, the solar module-sited disabling device sends the first signal and disables power output when it fails to receive the second signal within the first predefined time. The solar module is accordingly only of use to an authorized user in knowledge of the second signal and worthless to an unauthorized user having no knowledge of the second signal.

The invention permits a simple configuration of the security system which apart from the power line, necessary in any case, requires no connection between the solar module and the consumer.

In one advantageous aspect of the security system in accordance with the invention each first and second signal contains at least one pulse generated by disabling the power transfer via the power line.

In another advantageous aspect of the security system in accordance with the invention the solar module-sited disabling device and the consumer-sited enabling device each comprises a switching device for short-circuiting the power line to disable power transfer or to generate the aforementioned signals respectively.

This permits by advantageous ways and means a simple configuration of the security system when using the solar module with a battery charger including a charge regulator as the consumer operating on the shunt principle since in these charge regulators a short-circuiting device is already provided which can also be used by the security system, thus significantly simplifying circuiting.

The method in accordance with the invention permits by advantageous ways and means an integrated system for preventing unauthorized use of the solar module since no power transfer is possible without knowledge of a user authorization code or of the second signal.

The disabling device in accordance with the invention provides by advantageous ways and means security against unauthorized use or theft of the solar module in a system for simple and cost-effective production.

In one preferred embodiment the disabling device is configured integral with the solar module.

This arrangement ensures by advantageous ways and means that the disabling device in accordance with the invention cannot be defeated by tampering. The disabling device may be arranged, for example, as a slim-line assembly between the positive and negative leads in the laminate of the solar module or in or under the junction box where the leads are brought out directly from the laminate.

The enabling device in accordance with the invention comprises by advantageous ways and means a simple configuration for cost-effective production.

BRIEF DESCRIPTION OF THE DRAWINGS

Aspects of the present invention will now be detailed with reference to the attached drawings in which.

It is understood that in the following detailed description of the Figures like components and identified by like reference numerals in the various Figures to thus obviate a repeat description thereof.

DETAILED DESCRIPTION

Figure 1:
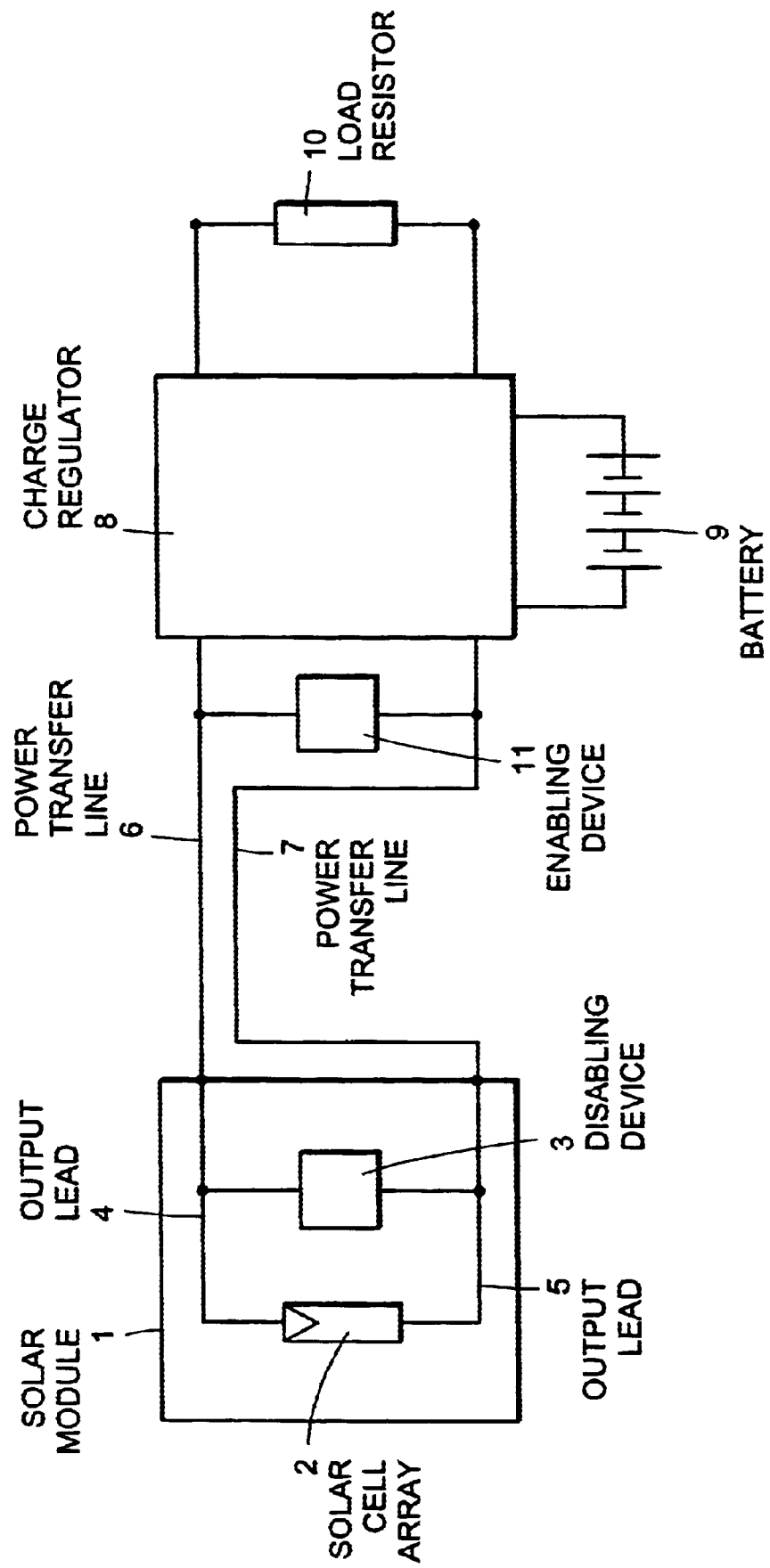
FIG. 1 is a block diagram of one embodiment of the security system in accordance with the invention comprising a solar module-sited disabling device and an consumer-sited enabling device, the consumer being represented by a charge regulator including a battery and a load.

Referring now to FIG. 1 there is illustrated diagrammatically the configuration of one embodiment of the security system for a solar module in accordance with the present invention. Reference numeral 1 in FIG. 1 identifies a solar module including a solar cell array 2 and a solar module-sited disabling device 3. The solar cell array 2 comprises one or more solar cells intercircuited to generate a rated output voltage or a rated output current. The solar module-sited disabling device 3 is connected in parallel to the solar cell array 2 between the output leads 4 and 5 of the solar cell array 2. The output leads 4 and 5 are connected to the power transfer lines 6 and 7 via which power can be transferred to the consumer site. At the consumer site a charge regulator 8 to which a battery 9 and load resistor 10 is connected represents the consumer. A consumer-sited enabling device 11 is connected between the inputs of the charge regulator 8, i.e. in other words between the power transfer lines 6 and 7.

The functioning of the security system as shown in FIG. 1 will now be described. When the solar cell array 2 generates no power, e.g. at night, no voltage is available at the inputs of the solar module-sited disabling device 3. In this case the solar module-sited disabling device 3 has no power supply and is OFF.

Considering now the case when the solar cell array 2 generates power, then the solar module-sited disabling device 3 receives a voltage supply via the output leads 4 and 5 of the solar cell array 2 and sends a first signal or first code to the consumer-sited enabling device. As evident from FIG. 1 this may be done via the power transfer lines identified by the reference numerals 6 and 7. In the preferred ways and means the first signal is generated by disabling the power transfer via the power transfer lines 6 and 7, i.e. by one or more pulses. The code represented by the signal can be varied in shape, length and number of the pulses.

The consumer-sited enabling device 11 detects or receives the first signal and sends a second signal to the solar module-sited disabling device 3. As evident from FIG. 1 this may be done via the power transfer lines 6 and 7, although, of course, other means of transfer are conceivable, e.g. via a separate line or by wireless communication. The second signal sent by the consumer-sited enabling device 11, just like the first signal, can be generated by disabling the power transfer from the solar cell array 2 via the power transfer lines 6 and 7 to the consumer 8, 9 and 10, i.e. by one or more pulses.

It is to be noted that the first and second code may be configured in any way as desired or suitable. In the simplest case this may involve two dedicated signals as dictated by simple circuit elements (capacitors, inductances, etc.) but also as signals obtained with the aid of microprocessors and encryption techniques, it being just as possible to alter the signals by wireless remote control or via a control line.

The solar module-sited disabling device 3 is configured such that when it fails to receive a response to a first signal it has sent within a defined period of time from the consumer-sited enabling device 11, i.e. when not receiving a second signal from the consumer-sited enabling device 11 then the power generated by the solar cell array 2 transmitted to the consumer 8, 9 and 10 via the power transfer lines 6 and 7 is disabled. This may happen when for example, no consumer or no consumer-sited enabling device 11 is connected to the solar module or the consumer 8, 9 and 10 comprises no consumer-sited enabling device 11.

The first case presents no problem since this is a condition in which the solar module is on standby. In the second case, i.e. the case in which a consumer 8, 9 and 10 attempts to use the solar module 1 without a consumer-sited enabling device 11, the power transfer to the consumer 8, 9 and 10 via the power transfer lines 6 and 7 is instantly disabled on timeout of the first predefined time period after the solar module security circuit 3 has sent the first signal.

This thus prevents unauthorized use of the solar module 1 by effective ways and means.

As evident from FIG. 1 the solar module-sited disabling device 3 is accommodated in the solar module 1 and is preferably configured integrally with the solar module 1. For this purpose the solar module-sited disabling device 3 may be configured for example, as a slim-line assembly connected between the output leads 4 and 5 of the solar cell array or arrangement of the circuited solar cells and accommodated in the laminate of the solar module 1. Likewise the solar module-sited disabling device 3 may be arranged in or under a junction box directly at a location where the output leads 4 and 5 of the solar cell array 2 are brought out from the laminate of the solar module. In other words the solar module-sited disabling device 3 is preferably connected to the solar module 1 so that removal of the solar module-sited disabling device 3 renders the solar module 1 useless, for example, by removal of the disabling device automatically resulting in the power leads within the module being broken.

Figure 2:
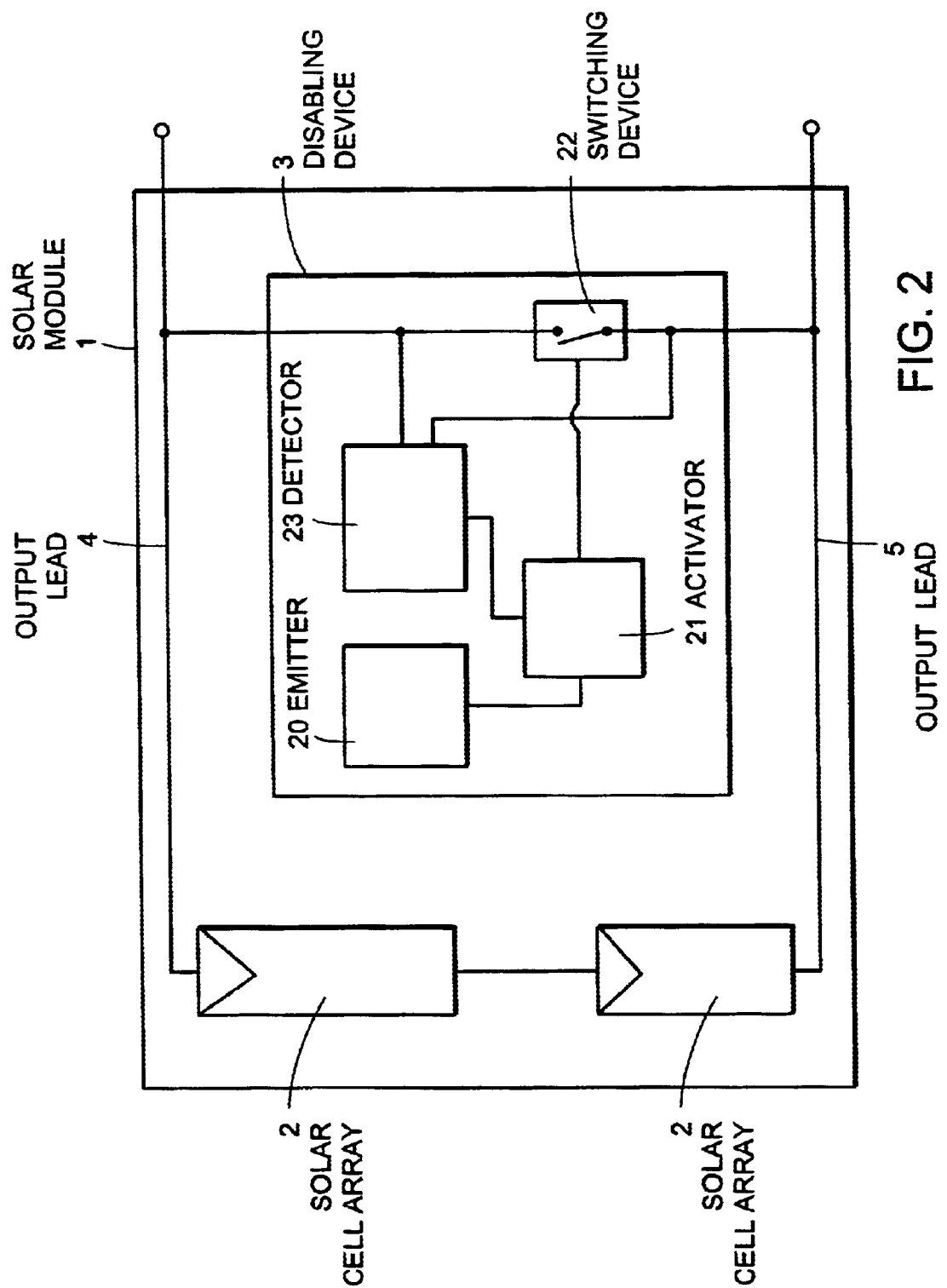
FIG. 2 is a block diagram of a solar module including two solar cell arrays including one embodiment of the solar module-sited disabling device in accordance with the invention.

Referring now to FIG. 2 the solar module-sited portion of the security system in accordance with the invention will now be described.

As evident from FIG. 2 it is possible to provide a solar module-sited disabling device 3 for a plurality of solar cell arrays 2, two of which are indicated connected in series in FIG. 2.

The solar module-sited disabling device 3 as shown in FIG. 2 comprises an emitter 20 for sending a first signal. The emitter 20 is provided with an activator means 21 for activating a switching device 22 represented symbolically by a switch. The switching device 22 is connected between the output leads 4 and 5 of the solar cell array 2. When the switching device 22 is closed the output leads 4 and 5 of the solar cell array 2, and thus the outputs of the solar module 1, are short-circuited.

In addition the solar module-sited disabling device 3 as shown in FIG. 2 comprises a detector 23 for receiving the second signal transmitted by a consumer-sited enabling device 11 (not shown in FIG. 2) via the power transfer lines 6 and 7 connected to the outputs of the solar module 1.

The functioning of the solar module-sited portion of the security system in accordance with the invention as shown in FIG. 2 will now be described.

When the solar cell array 2 generates no voltage the solar module-sited disabling device 3 has no power transfer and is thus OFF. When the solar cell array 2 generates a voltage the emitter 20 sends a first signal. This is sent by the emitter 20 outputting a corresponding signal to the activator means 21 which activates the switching device 22 such that a train of pulses corresponding to the first signal is generated. This train of pulses comprises at lease one, but preferably a plurality of short-circuit pulses in sequence on the power line. These are generated, as already mentioned by the switching device 22 being opened and closed. It is by these ways and means that information of many different kinds can be transferred with the first signal by the information being communicated for example, by means of trains of short-circuit marks and spaces (PPM modulation). Once the first signal has been sent by these ways and means the solar module-sited disabling device 3 assumes a standby condition for a first predefined period of time. If the detector 23 for receiving the second signal receives a second signal within the first predefined period of time then a user authorization code, i.e. a consumer having consumer-sited enabling device 11 is connected to the solar module 1 and thus the power transfer is not disabled.

When the detector 23 for receiving the second signal fails to receive a second signal within the first predefined time duration then the detector 23 outputs a corresponding signal to the activator means 21 so that the activator means 21 activates the switching device 22 such that the power transfer is disabled. For this purpose the output leads 4 and 5 of the solar cell array 2 are short-circuited.

Figure 3:
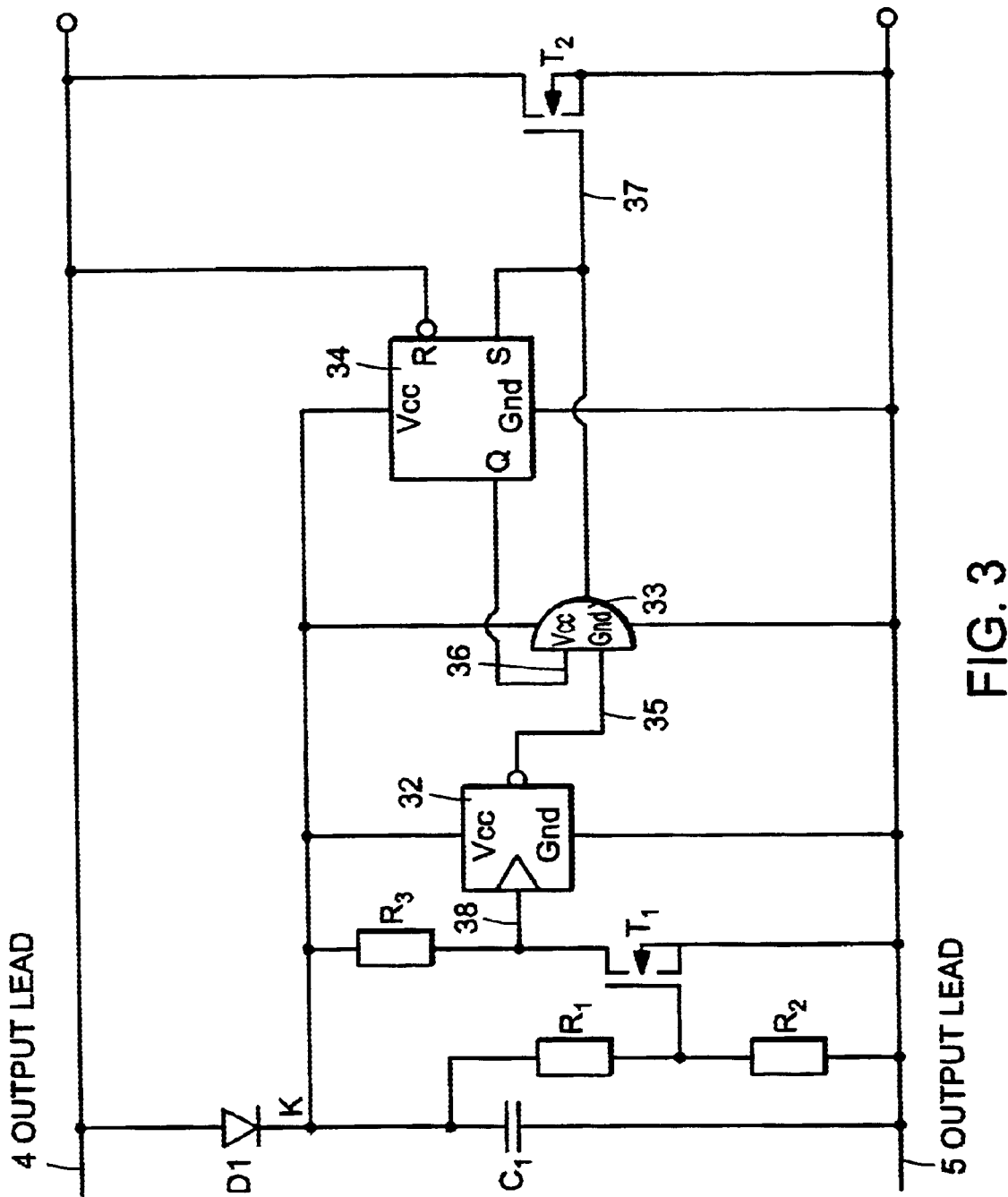
FIG. 3 is a circuit diagram of the solar module-sited disabling device as shown in FIG. 2.

Referring now to FIG. 3 there is illustrated a circuit diagram of a preferred solar module-sited disabling or security device 3. The disabling device as shown in FIG. 3 is connected between the output leads 4 and 5 of the solar cell array 2.

As evident from FIG. 3 a diode $D_1$ and capacitor $C_1$ serving as an energy storage element, are connected in series between the output leads 4 and 5 of the solar cell array 2. A node K formed by the junction of diode $D_1$ and capacitor $C_1$ is connected to the power supply inputs $V_{cc}$ of a monostable multivibrator 32, an AND gate 33 and a memory element 34 termed RS flip-flop in the following. A gate of a first transistor $T_1$ is connected via a resistor $R_1$ to the node K and via a resistor $R_2$ to the output lead 5. The drain of the first transistor $T_1$ is connected to the input of the monostable multivibrator 32 which in turn is connected via a resistor $R_3$ to the node K. The source of the transistor $T_1$ is connected to the output lead 5. Each ground terminal Gnd of the monostable multivibrator 32, AND gate 33 and RS flip-flop is connected to the output lead 5. The inverting output of the monostable multivibrator 32 is connected to an input 35 of the AND gate 33. A Q output of the RS flip-flop is connected to another input 36 of the AND gate. An output 37 of the AND gate 33 is connected to a set input S of the memory element 34 and a gate of a transistor $T_2$ connected between the output leads 4 and 5. The reset input R of the RS flip-flop is connected to the output lead 4. It is assumed for this circuit that the output lead 4 is the positive output lead of the solar cell array(s) 2.

The functioning of the circuit as described above for one aspect of the disabling device will now be described.

Assuming the output Q of the RS flip-flop is initially HIGH then when a solar cell array connected to the leads 4 and 5 generates a voltage the capacitor $C_1$ is charged via the diode $D_1$. As soon as the potential at the node K is sufficient for power supply of the components, transistor $T_2$ is ON since the inverted output of the monostable multivibrator 32 is HIGH and thus a HIGH signal is applied to the input 35 of the AND gate 33 and a further HIGH signal is applied to the input 36 of the AND gate 33 since the output Q of the RS flip-flop is HIGH. This results in a short-circuit pulse appearing on the leads 4 and 5 which, as described above, can be connected to the power transfer lines 6 and 7.

The length of this first short-circuit pulse corresponding to the first signal is defined by the ratio of $R_1$ to $R_2$.

At a critical value of the voltage across the capacitor $C_1$ as dictated by the ratio $R_1/R_2$ transistor $T_1$ is OFF as a result of which a HIGH potential or leading edge is applied to the input 38 of the monostable multivibrator 32.

On this leading edge the monostable multivibrator 32 outputs a LOW pulse of predefined duration to the input 35 of the AND gate 33, upon which the AND gate 33 outputs a LOW signal at its output 37.

This signals transistor $T_2$ OFF for the time duration of the LOW pulse of the monostable multivibrator 32.

Since the set input S of the RS flip-flop 34 is connected to the output 37 of the AND gate 33 the set input S of the memory element 34 is likewise LOW.

When no short-circuit pulse response is received from a consumer-sited security circuit or enabling device 11 during the OFF time duration of the transistor $T_2$, i.e. during the time duration of the LOW pulse of the monostable multivibrator 32 on the leads 4 and 5, transistor $T_2$ is returned ON at the end of the LOW pulse to thus short-circuit the leads 4 and 5.

Since the leads 4 and 5 are now short-circuited, capacitor $C_1$ is discharged. Once the voltage across the capacitor $C_1$ has dropped to a critical value, transistor $T_1$ is signaled OFF and the drain of transistor $T_1$ changes to LOW to thus produce a LOW signal at the input 38 of the monostable multivibrator 32.

As soon as the potential at the node K drops below a value which ensures power supply of the components, transistor $T_2$ is signaled OFF and thus, once capacitor $C_1$ has discharged to a critical value or in other words the energy storage element $C_1$ is "empty" transistor $T_2$ which by preferred ways and means is a power transistor, is signaled OFF and thus a short-circuit across the leads 4 and 5 defeated. The complete circuit is thus back to its starting condition and functioning recommenced anew.

When a consumer-sited security or enabling circuit 11 then sends within the LOW time duration of the output of the monostable multivibrator 32 and during which transistor $T_2$ is OFF, a short-circuit pulse response corresponding to a second signal via the power transfer lines 6 and 7 connected to the leads 4 and 5, then a LOW pulse appears at the reset input R of the RS flip-flop 34 as a result of which the RS flip-flop 34 is reset. This results in the output Q of the RS flip-flop 34 going LOW and transistor $T_2$ is not returned ON after the LOW pulse of the AND gate 33 to thus assure power transfer when a consumer-sited enabling device 11 sends a suitable second signal in the form of a short-circuit pulse to the solar module-sited disabling device or security circuit 3.

Figure 4:
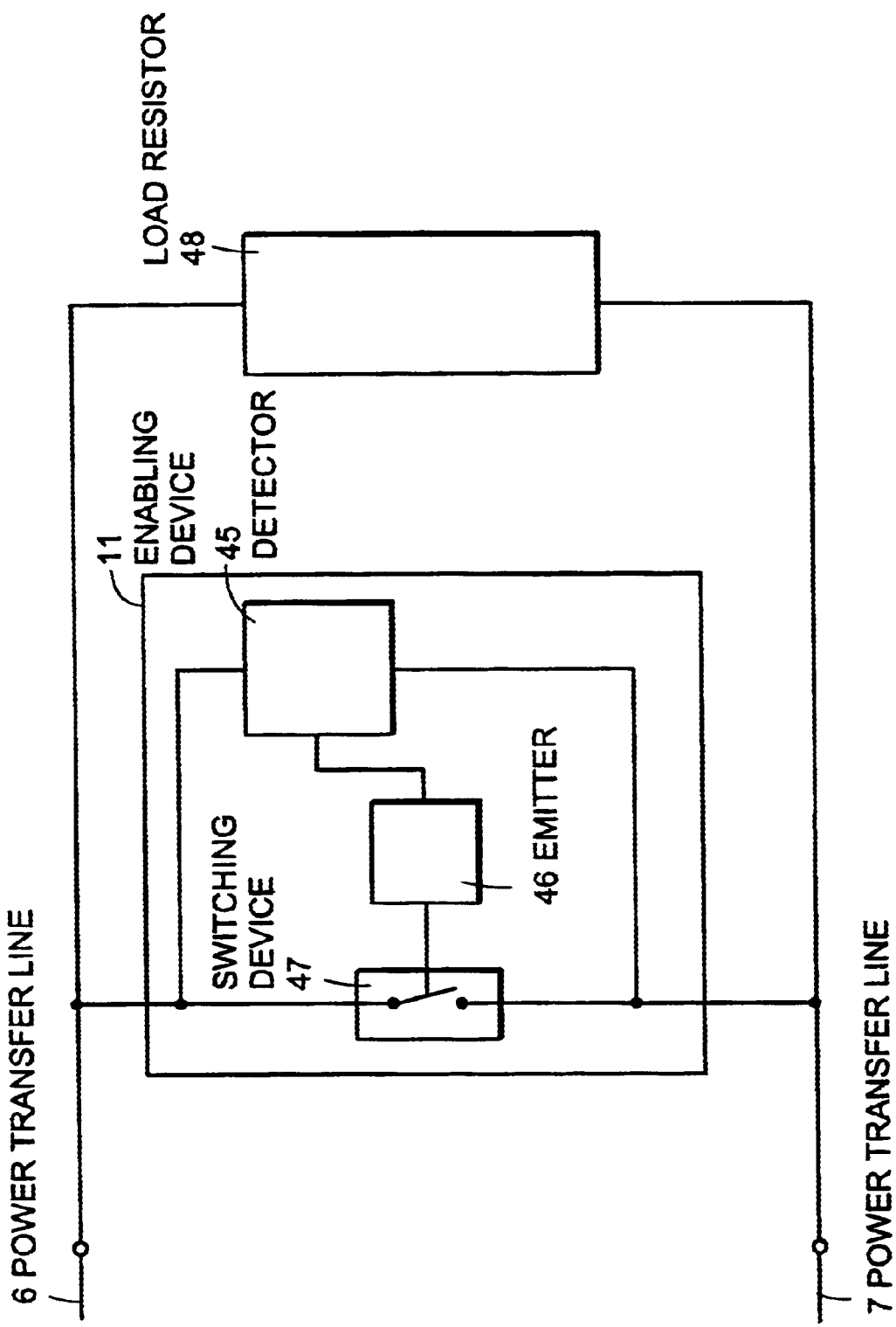
FIG. 4 is a block diagram of the consumer-sited portion of the security system in accordance with the invention for a solar module including a consumer-sited enabling device, the consumer being indicated as a load resistor.

Referring now to FIG. 4 there is illustrated an embodiment of the consumer-sited portion of the security system in accordance with the invention. As evident from FIG. 4a consumer-sited enabling device 11 is connected between the power transfer lines 6 and 7 which—as shown in FIG. 1—lead to the solar module 1. Shown as the load in FIG. 4 is a load resistor 48. The consumer-sited enabling device 11 comprises a consumer-sited detector 45 suitable for receiving a first signal or code form the solar module which is transmitted on the power transfer lines 6 and 7. The consumer-sited detector 45 is connected to a consumer-sited emitter 46 which in turn is connected to a consumer-sited switching device 47 for opening and closing it. The consumer-sited switching device 47 is connected between the power transfer lines 6 and 7.

The functioning of the consumer-sited portion of the security system in accordance with the invention will now be described.

When the consumer-sited portion of the security system in accordance with the invention as shown in FIG. 4 is not connected to a solar module or is connected to a solar module generating no power, the consumer-sited enabling device 11 is on standby.

As soon as a voltage is applied to the power transfer lines 6 and 7 the consumer-sited enabling device 11 receives a power supply. As described above the solar module-sited disabling device 3 sends a first signal, comprising e.g. short-circuit marks and spaces. When the consumer-sited detector 45 detects this first signal or first code it outputs a corresponding signal to the consumer-sited emitter 46 to activate the consumer-sited switching device 47 such that e.g. by means of short-circuit marks and spaces a second signal is transmitted as the response to the first signal via the power transfer lines 6 and 7 to the solar module.

Assuming now that the second signal is a single short-circuit pulse then the enabling device 11 can be realized by means of a monostable multivibrator which activates a transistor employed as the switching device.

Figure 5:
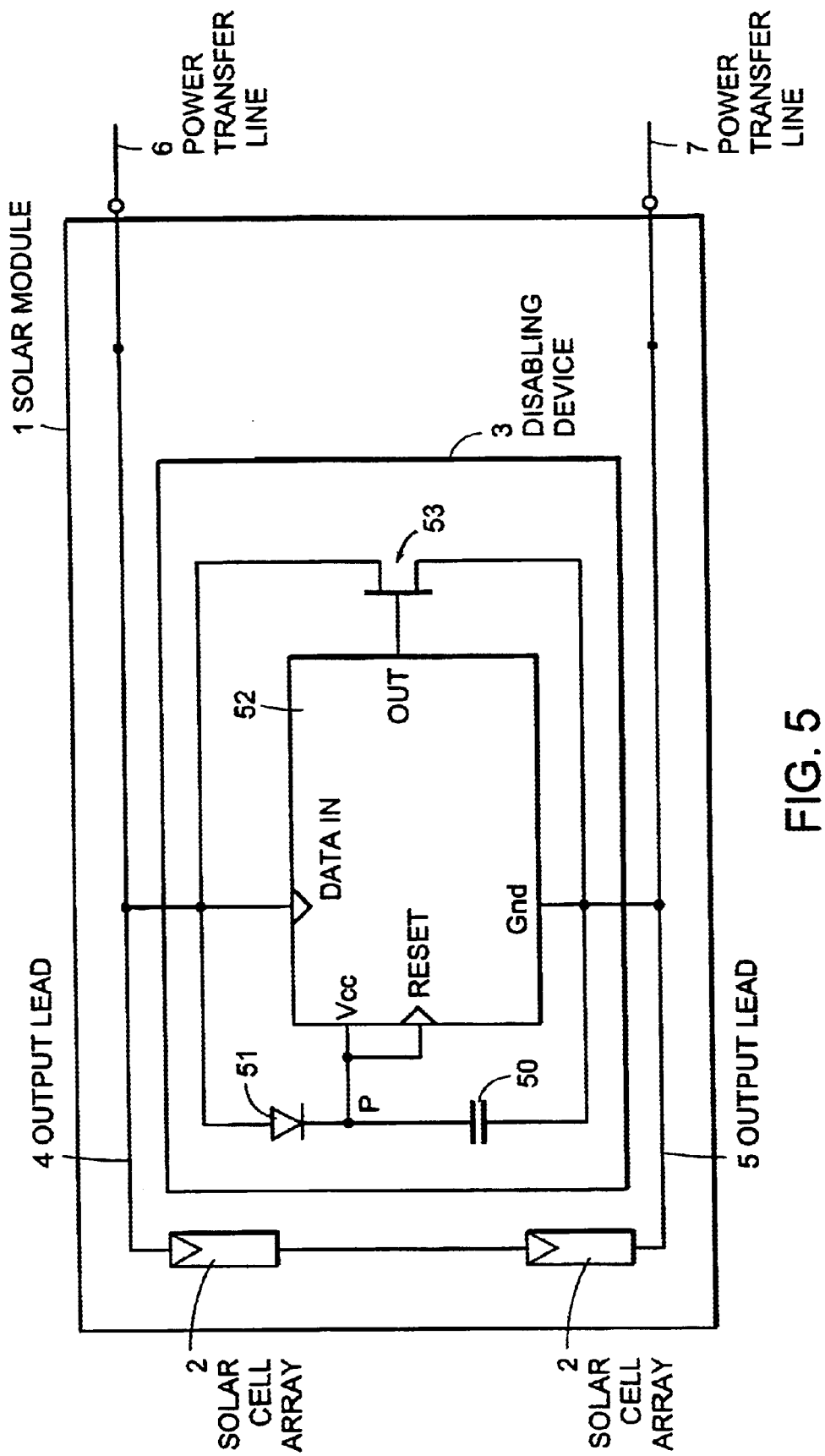
FIG. 5 is a block diagram of a further embodiment of the solar module-sited portion of the security system in accordance with the invention including a solar module-sited disabling device.
Figure 6:
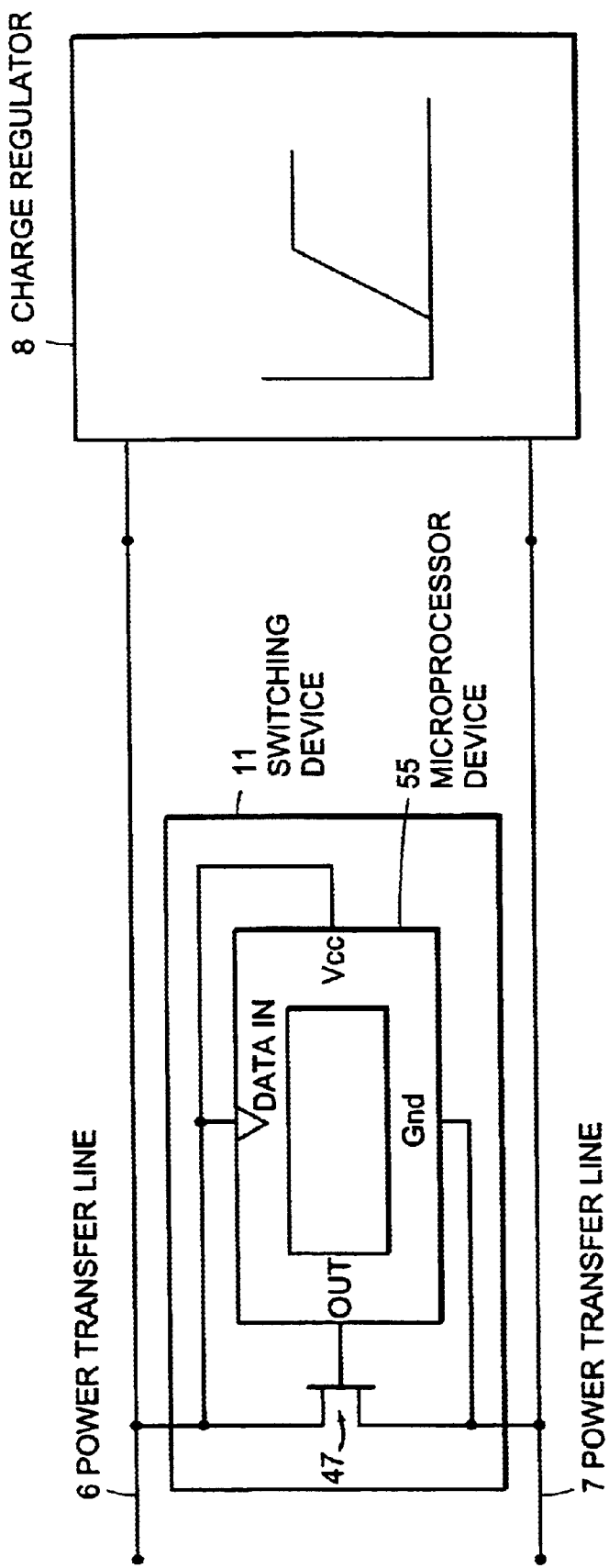
FIG. 6 is a circuit diagram of a further embodiment of the consumer-sited portion of the security system in accordance with the invention for a solar module including a consumer-sited enabling device, the consumer being indicated as a charge regulator.

Referring now to FIGS. 5 and 6 a further embodiment of a security system in accordance with the invention will now be described, FIG. 5 showing the solar module-sited portion of the security system and FIG. 6 the consumer-sited portion.

The solar module 1 as shown in FIG. 5 comprises a plurality of solar cell arrays 2 connected in series. The output leads 4 and 5 of the solar cells are connected via the outputs of the solar module 1 to the power transfer lines 6 and 7: the solar module-sited security circuit or disabling device 3 as shown in FIG. 5 comprises an energy storage element 50 which in this case is realized as a capacitor connected in series with a diode 51 between the leads 4 and 5 of the solar cell arrays 2. The node P formed by means of the junction between the capacitor 50 and diode 51 is connected to a power supply terminal $V_{cc}$ of a microprocessor device 52. A data IN input of the microprocessor device 52 is connected to an output lead 4 of the solar cell arrays 2 and a ground terminal GND of the microprocessor device 52 is connected to the other output lead 5 of the solar cell arrays 2. The microprocessor device 52 comprises in addition an output terminal Out which is connected to a switching device 53 connected between the output leads 4 and 5 of the solar cell arrays 2.

By preferred ways and means the switching device 53 is a power transistor whose gate is connected to the output terminal Out of the microprocessor device 52.

Referring now to FIG. 6 there is illustrated the consumer-sited portion of the security system in accordance with the invention including a charge regulator 8 connected to the power transfer lines 6 and 7. To make for a better overview the battery and load resistor 10 as shown in FIG. 1 have been omitted in this case.

The consumer-sited enabling device 11 as shown in FIG. 6 comprises a consumer-sited switching device 47 connected between the power input lines of the consumer. In the arrangement as shown in FIG. 6 the power inputs of the consumer are the power transfer lines 6 and 7.

The consumer-sited switching device 47 is preferably configured as a power transistor whose gate is connected to an output terminal Out of a consumer-sited microprocessor device 55. A data input Data IN of the consumer-sited microprocessor device 55 and a power supply input $V_{cc}$ of the consumer-sited microprocessor device 55 are connected to a power transfer line 6 and a ground terminal GND of the consumer-sited microprocessor device 55 is connected to the other power transfer line 7.

Figure 7A:
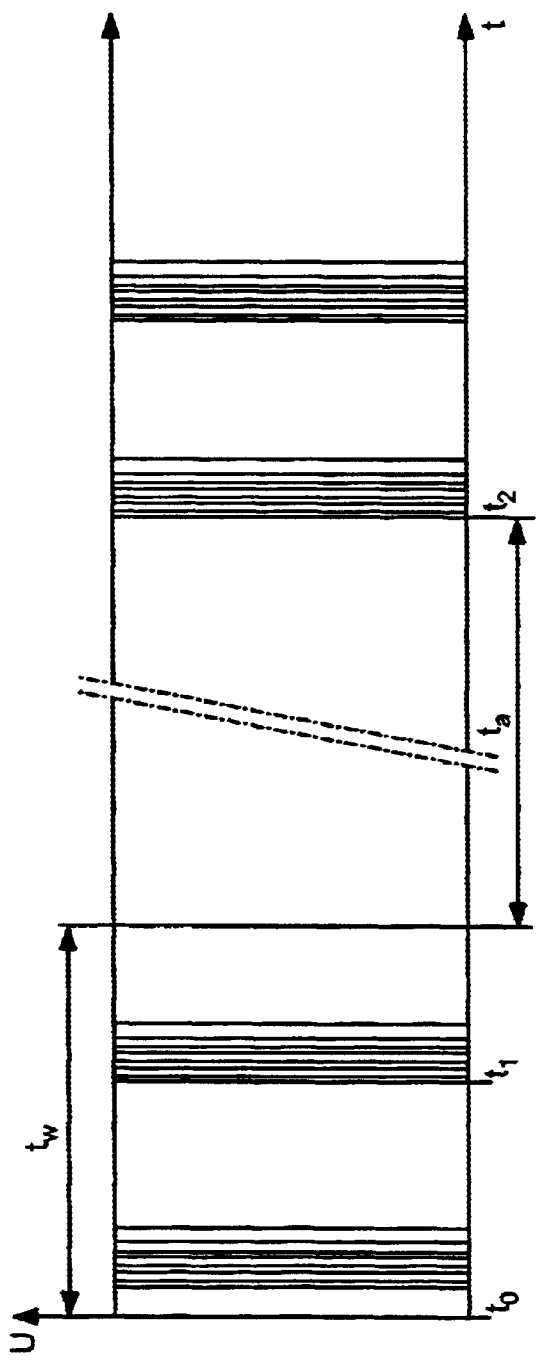
FIG. 7a is a plot of the voltage profile with time in the security system as described with reference to FIGS. 5 and 6 for a power output to an authorized consumer.
Figure 7B:
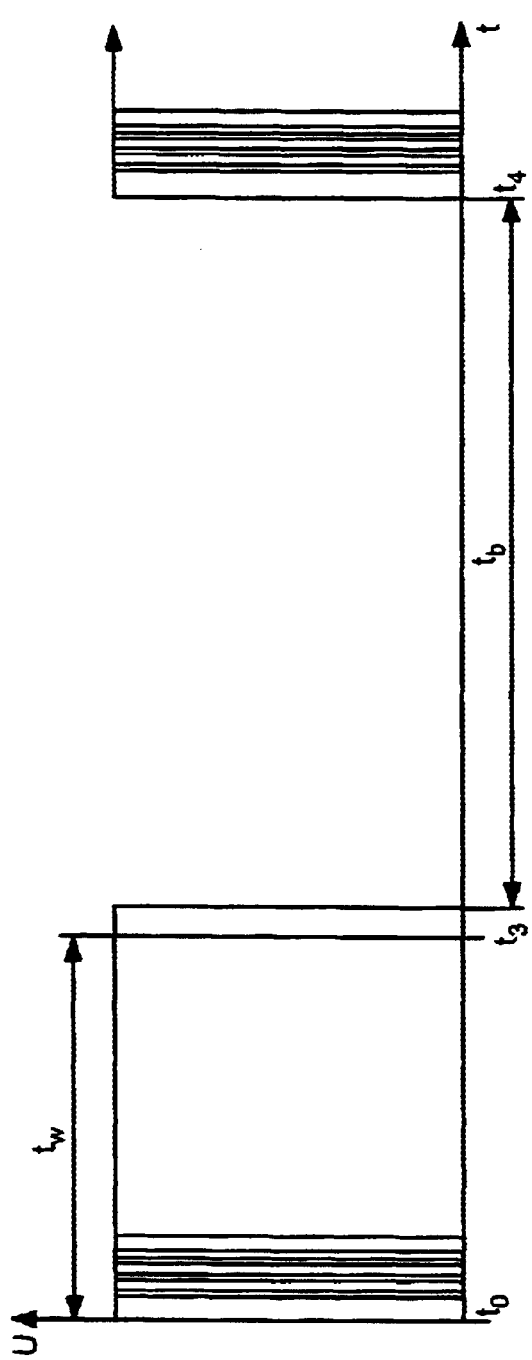
FIG. 7b is a plot of the voltage profile with time in the security system as described with reference to FIGS. 5 and 6 for a non-existent or non-authorized consumer.

Referring now to FIGS. 7a and 7b the functioning of the solar module-sited portion of the security system including the solar module-sited disabling device 3 as shown in FIG. 5 and the consumer-sited portion of the consumer-sited security or enabling device 11 as shown in FIG. 6 will now be described.

FIG. 7a is a plot of a voltage profile with time in the security system as described with reference to FIGS. 5 and 6 illustrating power output to an authorized consumer.

When the solar cell arrays 2 generate a voltage, capacitor 50 is charged via diode 51. As soon as the potential of the junction between diode 51 and capacitor 50 exceeds a predefined value assuring power supply of the microprocessor device 52, the microprocessor device 52 outputs a signal at the output terminal Out to the switching device 53 to transmit by means of a train of short-circuit marks and spaces at the point in time $t_0$ a first signal via the power transfer lines 6 and 7 to the consumer-sited portion of the security system. In FIG. 7b this pulse train is represented by a plurality of very short short-circuit pulses. This pulse train can be encrypted in the switching device 53 and may also contain in addition to the first signal also information as regards the rating of the solar module, for example.

Since the input $V_{cc}$ of the solar module-sited microprocessor device 52 is connected to the reset input of the solar module-sited microprocessor device 52 a defined starting condition is assured.

In the consumer-sited enabling device 11 the consumer-sited microprocessor device 55 detects via a data input the first signal transmitted via the power transfer lines 6 and 7. In response to having received this first signal the consumer-sited enabling device 11 returns a corresponding second signal via the power transfer lines 6 and 7 to the solar module. This is done by the consumer-sited microprocessor device 55 activating the switching device 47 so that it generates a train of short-circuit marks and spaces corresponding to the second signal at the first point in time $t_1$ on the power transfer lines 6 and 7.

The second signal may be an identification signal defined for each consumer. In addition the consumer-sited enabling device 11 may comprise a chip card reader including a corresponding control processor, a numerical input keypad for enabling a metered power output, a wireless detector to detect the enable code by remote control or similar control systems. Since by means of the first and second signals a plurality of information signals can be exchanged between the solar module-sited portion and the consumer-sited portion it is thus possible to meter e.g. the power transmitted. In addition it is possible e.g. by means of the aforementioned chip card to instantly implement debiting the chip card of the user corresponding to the metered power consumed.

The solar module-sited microprocessor device 52 arranged in the solar module-sited disabling device 3 detects the second signal transmitted via the power transfer lines 5 and 6 and activates the solar module-sited microprocessor device 52 correspondingly when the second signal is detected at a transistor $T_2$ within the time duration $t_w$ as of the first signal being sent or as of the device being signaled ON.

When the second signal, as indicated above, comprises for example, a user authorization code, the solar module-sited microprocessor device 52 verifies whether the consumer is authorized. When the consumer is authorized and the user authorization code is legitimate the power transfer to the consumer site is not disabled. Verifying the authorization code may be done for example, by comparing it in the solar module-sited microprocessor device 52 to reference codes held in a memory (not shown) of the solar module-sited microprocessor device 52.

When the second signal comprises, for example, an indication as to the metered power to be output to the consumer, a corresponding metered power output is transferred during a time duration $t_a$ as shown in FIG. 7a. This metered power output may be defined e.g. consumer-specific as indicated above. On timeout of time duration $t_a$ the solar module-sited disabling device 3 in the solar module again sends the first signal and waits to receive the second signal.

Should, as shown in FIG. 7b, the solar module-sited disabling device 3 fail to receive a suitable signal within the time duration $t_w$ after having sent the first signal at the point in time $t_0$, i.e. either receiving no second signal or a second signal having no legitimate user authorization code the switching device 53 is activated such that it disables power transfer or, in other words short-circuits the output leads 4 and 5 of the solar cell array 2.

This short-circuit is maintained for a predefined time duration $t_b$. This time duration $t_b$ corresponds to the time duration until the capacitor 50 has discharged sufficiently so that the potential at the node P between the diode 51 and capacitor 50 is no longer sufficient for power supply of the solar module-sited microprocessor device 52, as a result of which the power transfer during the time duration $t_b$ is disabled by the switching device 53 by means of the output leads 4 and 5 of the solar module 2 being short-circuited. The time duration $t_b$ during which power transfer is disabled is dictated by the energy stored in the capacitor 50.

When the potential at the node P between diode 51 and capacitor 50 drops below a critical value, i.e. once the capacitor 50 has been discharged to a value at which the potential between diode 51 and capacitor 50 drops below the supply voltage needed to operate the solar module-sited microprocessor device 52, the solar module-sited microprocessor device 52 is signaled OFF, as a result of which the potential at the output terminal Out of the solar module-sited microprocessor device 52 drops to a LOW level and thus against disables the switching device 53, i.e. disabling the short-circuit between the leads 4 and 5.

Accordingly, the system reverts to its starting condition and functioning recommences anew as described above.

The present invention is particularly of advantage in an arrangement in which the solar cell arrays are configured modular. For example, individual solar modules may be configured as stand-alone modules which may also be connected in series with security. The functioning of the security devices in accordance with the invention is not detrimented by connecting the individual solar modules in parallel. In addition the modular configuration makes it simple for it to be integrated in a solar farm.

To achieve compact circuits these are preferably configured as PIC microchips. In addition the present invention may be realized by a smart FET configuration with space available in the power transistor for a smart control.

What is claimed is:

1. A security system for a solar module, which is adapted to provide power to a consumer via a power transfer line that extends between a power output terminal of the solar module and a power input terminal of the consumer, the security system comprising:

a solar module-sited disabling device, adapted to be coupled to the power output terminal of the solar module, that transmits a first signal;

a consumer-sited enabling device adapted to be coupled to the power input terminal of the consumer, and adapted to receive the first signal and to transmit a second signal to the solar module-sited disabling device when the receipt of the first signal is detected;

wherein the power transfer line carries the first and second signals, and wherein the solar module-sited disabling device is configured to disable transfer of the power generated by the solar module to a consumer when the solar module-sited disabling device fails to receive the second signal within a predetermined time period.

2. The security system as claimed in claim 1, wherein the solar module-sited disabling device comprises a switching device that generates the first signal by short-circuiting the power transfer line, and wherein the consumer-sited enabling device comprises a switching device that generates the second signal by short-circuiting the power transfer line.

3. The security system as claimed in claim 1, wherein the solar module-sited disabling device comprises a switching device that disables a power output of the solar module by short-circuiting the power transfer line, and wherein the consumer-sited enabling device comprises a switching device that generates the second signal by short-circuiting the power transfer line.

4. The security system as claimed in claim 3, wherein the solar module-sited disabling device further comprises an energy storage element, and wherein the power output of the solar module is disabled by the switching device until substantially all of an amount of energy stored by the energy storage element is dissipated.

5. The security system as claimed in claim 1, wherein the solar module-sited disabling device is integrally formed with the solar module.

6. A method of transferring power from a solar module to a consumer, comprising acts of:

transmitting a first signal to the consumer;

transmitting a second signal to the solar module when the receipt of the first signal is detected, the second signal comprising a user authorization code;

forming the first and second signals by a pulsed disabling of the transferring of power between the solar module and the consumer;

verifying that the consumer is authorized to obtain power from the solar module, based on the second signal; and enabling power transfer from the solar module to the consumer; and disabling the power transfer when any one of the second signal is not received within a predetermined time period and the consumer is not authorized to obtain power.

7. The method as claimed in claim 6, wherein the acts of transmitting the first signal and the second signal comprise short-circuiting a power transfer line, the first signal and the second signal being transmitted via the power transfer line.

8. The method as claimed in claim 6, wherein the act of disabling the power transfer comprises maintaining a short-circuit of a power transfer line for a predetermined time period.

9. A disabling device, disposed at a power output terminal of a solar module, the power output terminal being coupled to a power input terminal of a consumer via a power transfer line which enables power transfer from the solar module to the consumer, comprising:

an emitter that transmits a first signal via the power transfer line;

a detector that receives a second signal via the power transfer line;

a switching device that disables the power output of the solar module when activated; and an activator device that activates the switching device when the detector fails to receive the second signal within a predetermined time period.

10. The disabling device as claimed in claim 9, wherein the first signal and the second signal each comprise at least one pulse formed by a pulsed disabling of the power output of the solar module.

11. The disabling device as claimed in claim 9, wherein the activator device comprises an energy storage element coupled to the switching device, and wherein the activator device activates the switching device for a time period based on an amount of energy stored by the energy storage element.

12. The disabling device as claimed in claim 9, wherein the switching device disables the power output of the solar module by short-circuiting the power output terminal of the solar module.

13. The disabling device as claimed in claim 9, wherein the disabling device is integrally formed with the solar module.

14. The disabling device as claimed in claim 9, wherein the disabling device is formed in a laminate of the solar module.

15. An enabling device, disposed at a power input terminal of a consumer, the power input terminal being coupled to a power output terminal of a solar module via a power transfer line that enables power transfer from the solar module to the consumer, comprising:

a detector adapted to detect receipt of a first signal from the solar module via the power transfer line; and an emitter adapted to transmit a second signal to the solar module via the power transfer line when the detector detects receipt of the first signal.

16. The enabling device as claimed in claim 15, wherein the first signal and the second signal each comprise at least one pulse formed by a pulsed disabling of the power output of the solar module.

17. The enabling device as claimed in claim 15, wherein the emitter comprises a switching device that short-circuits the power input terminal of the solar module to generate the second signal.

* * * * *